April 23, 1957 L. E. SETZER 2,789,649
GUIDANCE AND CONTROL OF SELF-PROPELLED VEHICLES
Filed March 23, 1953 5 Sheets-Sheet 1

Inventor:
Logan E. Setzer

Inventor:
Logan E. Setzer

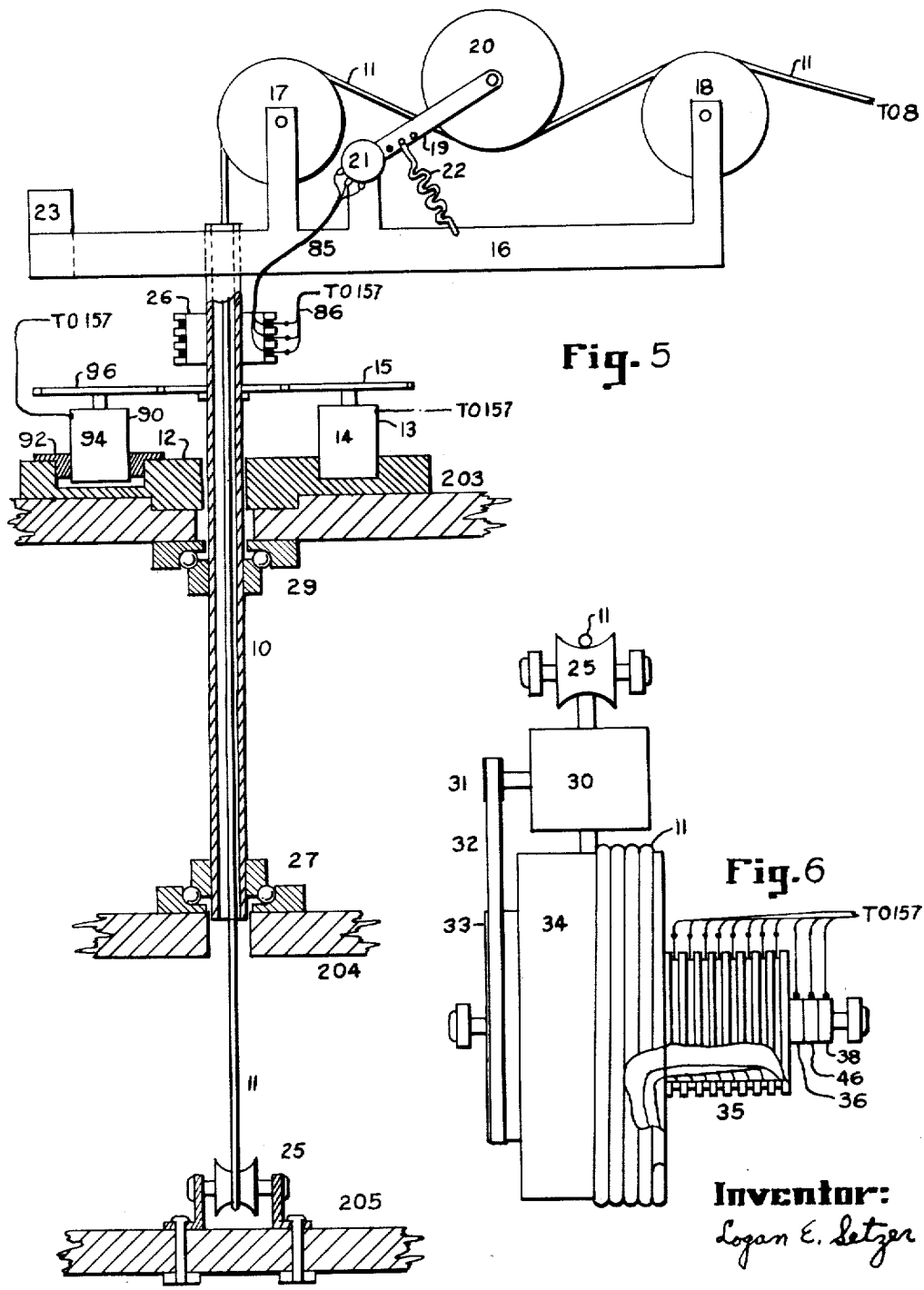

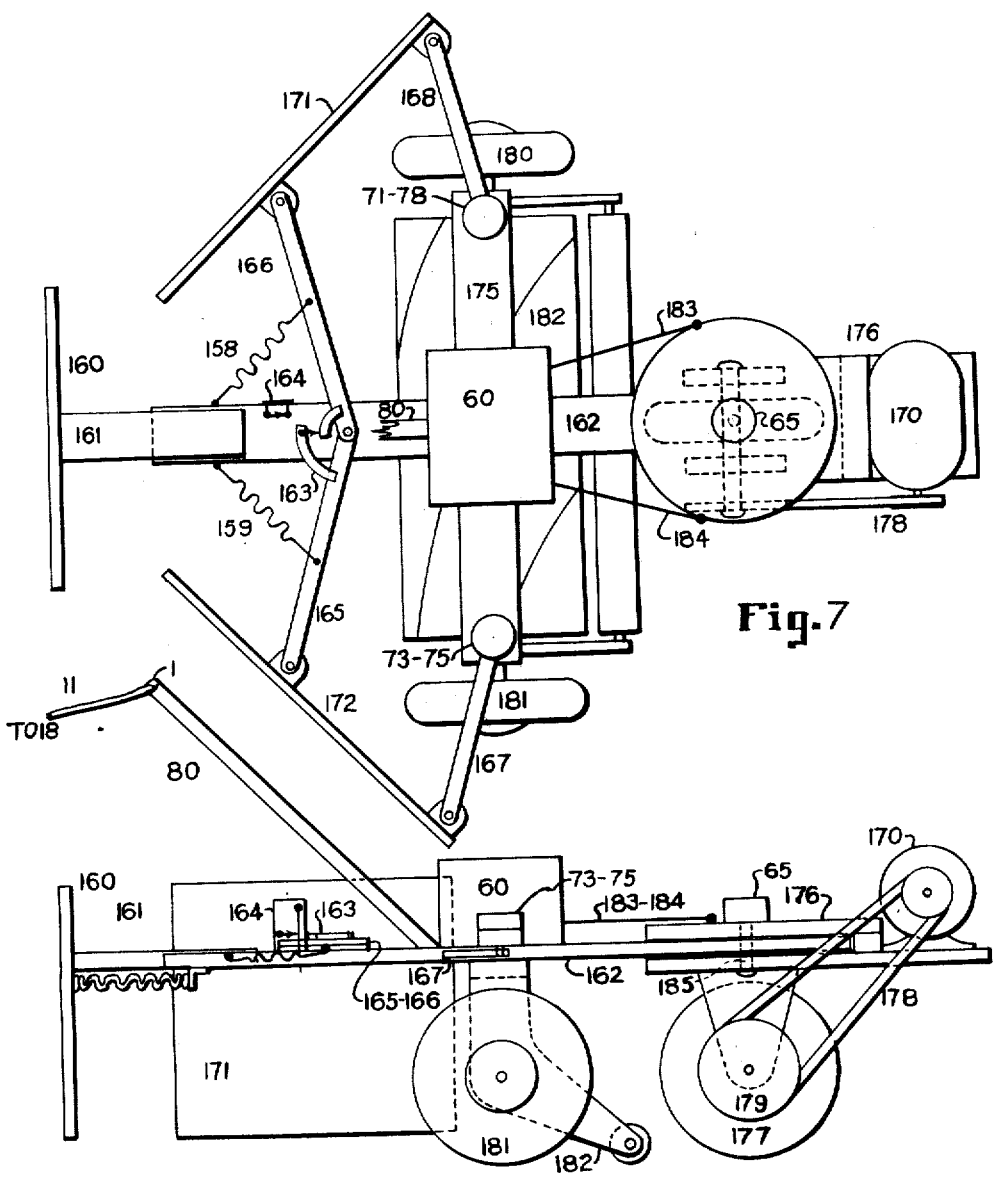

United States Patent Office 2,789,649
Patented Apr. 23, 1957

2,789,649

GUIDANCE AND CONTROL OF SELF-PROPELLED VEHICLES

Logan E. Setzer, Speedway, Ind.

Application March 23, 1953, Serial No. 344,257

28 Claims. (Cl. 180—79.1)

(Granted under Title 35, U. S. Code (1952), sec. 266)

This invention relates to guidance and control of self-propelled vehicles generally and particularly to the application and adaptation of control and guidance where the course to be traveled is rather short and often repeated exactly or repeated except for a change in direction or position.

In many present day operations involving self-propelled machines or vehicles the operator's chief duties are (1) to provide guidance along a particular straight line course until the end of the course is reached, (2) to select a new course, (3) to provide guidance along it, etc. Some examples of this kind of operation are: Sowing of seeds with a tractor-drawn grain drill, mowing a lawn with a power lawn mower, spreading manure and other fertilizers with a tractor-drawn fertilizer spreader, tamping earth in large earth moving operations, and countless other agricultural, industrial and domestic operations.

The primary object of the present invention, therefore, is to provide a method of guidance and control which is capable of automatically supplying turn signals of the proper amount and direction to (1) guide a self-propelled vehicle along a pre-selected straight line course to a pre-selected point on the course, (2) then select another straight line course differing from the first course in some predetermined manner, (3) guide the vehicle along the new course to a point or limit, where a third course is selected and the vehicle shifted to that course, and so on until a field has been swept over at which time the vehicle is stopped and operation ceases. Since this invention is to be used in conjunction with a self-propelled vehicle, the units should be sturdy, yet light in weight, compact, and low in power consumption.

In the illustrative embodiment described hereinafter, the invention is applied to the guidance and control of a lawn mower suitable for use on a lawn around a residence or on a golf green, or the like. This illustrative embodiment is not intended to limit the scope of application of the invention, however, because, as above indicated, the principles are general and the invention is adaptable to many applications.

The foregoing and other objects and advantages will become apparent, however, from the following description of the illustrative embodiment taken with the drawings thereof, wherein:

Fig. 5 is a somewhat diagrammatic elevation, partly in section, showing a method of mounting the resolvers, direction indicators, cable tension measuring equipment and vertical tube as viewed from the front of the control station;

Fig. 6 is a somewhat diagrammatic plan view of the equipment mounted between the middle and bottom decks of the control station in the embodiment of Fig. 1;

Fig. 7 is a somewhat diagrammatic plan view of the controlled vehicle;

Fig. 8 is a similar left side view of the controlled vehicle with the left collision fender removed.

Figure 2:
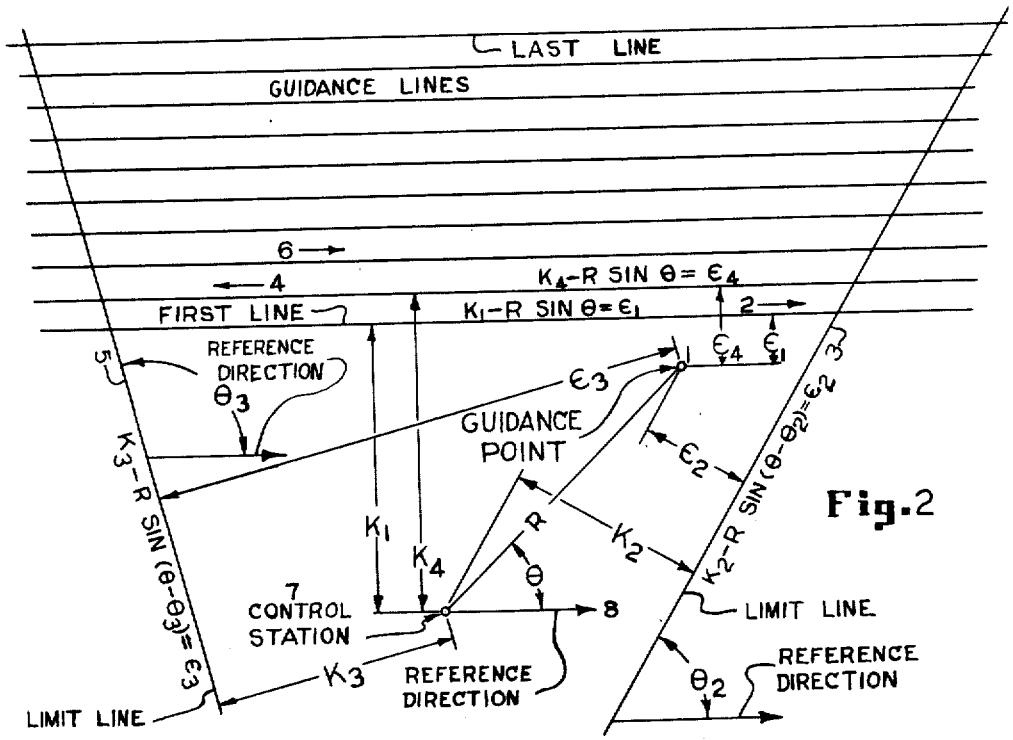
Fig. 2 is a diagram of an area to be swept over by the machine, illustrating the mathematical relationships that determine the courses to be followed by the vehicle and establish limits of travel along the courses.
Figure 2:
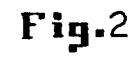

Referring now to Fig. 2, it is desirable that the guidance point indicated at 1 be guided along line 2 in the direction indicated by the arrow to the point where line 2 intersects line 3. There the vehicle should turn and travel along line 4 in the direction indicated by the arrow, to the point where line 4 intersects line 5, thence along line 6 to line 3, etc., until the vehicle arrives at the limit line at the end of the last guidance line, where the vehicle stops and ceases operation. In accordance with this invention, such control is effected by the use of polar coordinates, and for this purpose in the system as described, a fixed point 7, at which the control station is to be located, forms the pole, and a line 7—8 extending therefrom forms the polar axis (considered positive in the direction from 7 to 8) respectively of the polar coordinate system. In the following discussion the reference direction will be taken parallel to and in the same direction as the polar axis. This system will be used for the mathematical discussion which follows.

*Mathematical discussion*

With the foregoing prescribed conditions, let R be the length of a straight line joining points 1 and 7, and θ the angle between line R and the polar axis 7—8. Let $E_1$ be the perpendicular distance from line 2 to point 1, and $K_1$ be the perpendicular distance from line 2 to point 7. The distance $E_1$ may then be described mathematically as follows:

$$E_1 = K_1 - R \sin \theta \quad (1)$$

Let $E_2$ be the perpendicular distance from line 3 to point 1, $K_2$ the perpendicular distance from line 3 to point 7, and $\theta_2$ the angle between the reference direction 7—8 and line 3. The distance $E_2$ may then be described mathematically as follows:

$$E_2 = K_2 - R \sin (\theta - \theta_2) \quad (2)$$

Let $E_3$ be the perpendicular distance from line 5 to point 1, $K_3$ the perpendicular distance from line 5 to point 7, and $\theta_3$ the angle between the reference direction and line 5. The distance $E_3$ may then be described mathematically as follows:

$$E_3 = K_3 - R \sin (\theta - \theta_3) \quad (3)$$

It is thus seen that by these mathematical expressions the three variable distances of the point 1 from (a) the first line of travel, (b) the first limit line 3, and (c) the second limit line 5, in each instance are expressed in terms of two identical variables, namely, the azimuthal direction and distance from the pole to the point 1, coupled only with selected fixed factors. Based on this mode of dealing with three variable distances, the present invention, as will more clearly appear hereinafter, places the pole and polar-axis at a control station and the point 1 on the vehicles, and provides a method and means that continuously measure the length of a line connecting the pole and the point 1, and the angular direction between such connecting line and the polar axis (i. e., the polar coordinates of the point 1 with reference to pole 7 and line 7—8); a method and means that control such length and angularity, to produce the desired travel of the vehicle; a method and means for holding the vehicle on course with little or no "hunting" laterally of the course; a method and means for altering the course, when a limit line is reached, and a method and means for stopping the vehicle when the desired travel has been completed.

*General arrangement.—Vehicle, control station, and cable*

Figure 1:
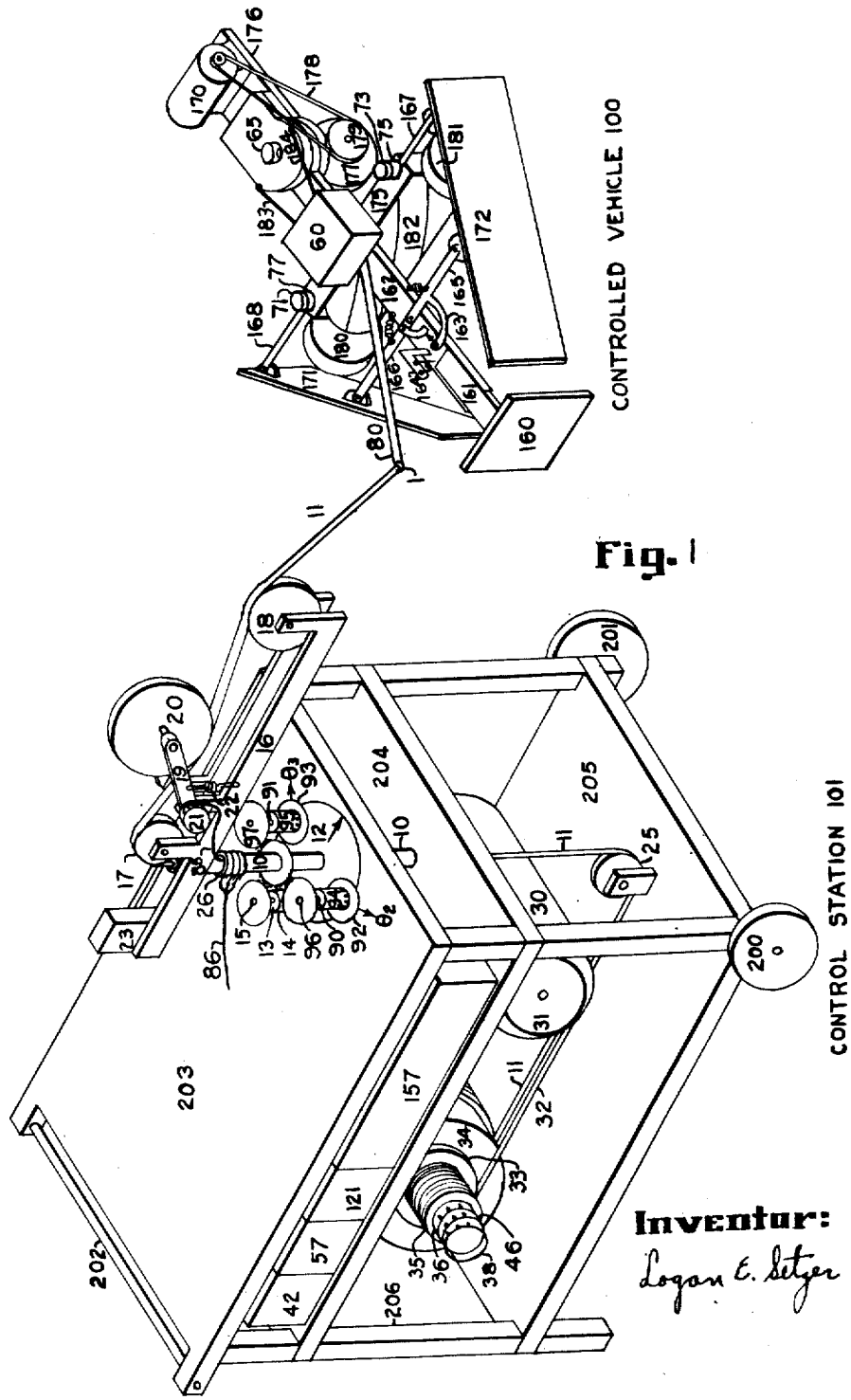
Fig. 1 is an isometric drawing of the control station, control cable, and vehicle, showing the arrangement of the various controls, amplifiers, motors, implements, and servomotors.

Referring now to Figs. 1, 7 and 8, the illustrative embodiment consists of control station 101, controlled vehicle 100, and interconnecting cable 11. Control station 101 computes the position of vehicle 100 and creates the proper control signals so that vehicle 100 travels the courses described hereinbefore. Cable 11 serves two functions: (*a*) It transmits power and control signals from control station 101 to vehicle 100, and (*b*) it serves as a mechanical link used to measure the distance and azimuthal direction with respect to polar axis 12 from control station 101 to vehicle 100, i. e., the polar coordinates of the vehicle 100.

Control station 101, as described in this embodiment, consists of a framework 206 supporting three decks 203, 204, and 205 upon which are mounted the associated measuring, calculating, and control equipment. Framework 206 is provided with two wheels 200 and 201, and handle 202 to facilitate moving control station 101 from one field to another. Vehicle 100 (Figs. 7 and 8) has three wheels 177, 180, and 181. Wheel 177 is the driving and steering wheel, and is mounted on a rotatable support 176 shown extending rearwardly from the vehicle. Motor 170, which is also mounted on support 176, drives wheel 177 by means of belt 178 and pulley 179. Support 176 is held to beam 162 by a vertical shaft 185 (see Fig. 8) which is in part the shaft of a potentiometer 65, so that support 176 turns shaft 185 of potentiometer 65 when support 176 is rotated to steer vehicle 100. As best shown in Fig. 7, support 176 is rotated to steer vehicle 100 by steering motor 60 through steering cables 183 and 184. To make a right turn, cable 183 is shortened and cable 184 is lengthened, rotating support 176 in a counterclockwise direction, looking down. To make a left turn, cable 184 is shortened and cable 183 is lengthened, rotating support 176 in a clockwise direction, looking down. Beam 162 and frame 175 transmit driving forces from support 176 to wheels 180 and 181. Implement 182, a reel-type lawn mower in the form shown, is supported on a shaft through wheels 180 and 181. Boom 80 is mounted to beam 162 and extends forward and up to support guidance point 1 (corresponding to point 1 in Fig. 2) in a position to obtain damping about the selected course, as hereinafter described.

Referring to Figs. 1 and 5, in control station 101, vertical tube 10 is at the pole point 7 of the polar coordinate system described in connection with Fig. 2 above, and the payed out length of cable 11 measures the distance R from the pole point 7 (or control station) to the guidance point 1. Pointer 12 (Fig. 1) is set to align with the reference direction of line 7—8 and arm 16 attached to tube 10 always lies in the direction of guidance point 1. θ thus is the azimuthal angle between arm 16 and pointer 12 and is measured electrically by resolver 13. As best shown in Fig. 5, stator 14 of resolver 13 is mounted on reference direction indicator 12, and its rotor 15 is geared to tube 10. In effect, resolver 13 is a vario-coupler, in which the voltages induced in the rotor winding by a voltage in the stator is proportioned to the sine of the angle θ between the rotor and the stator.

Figure 4:
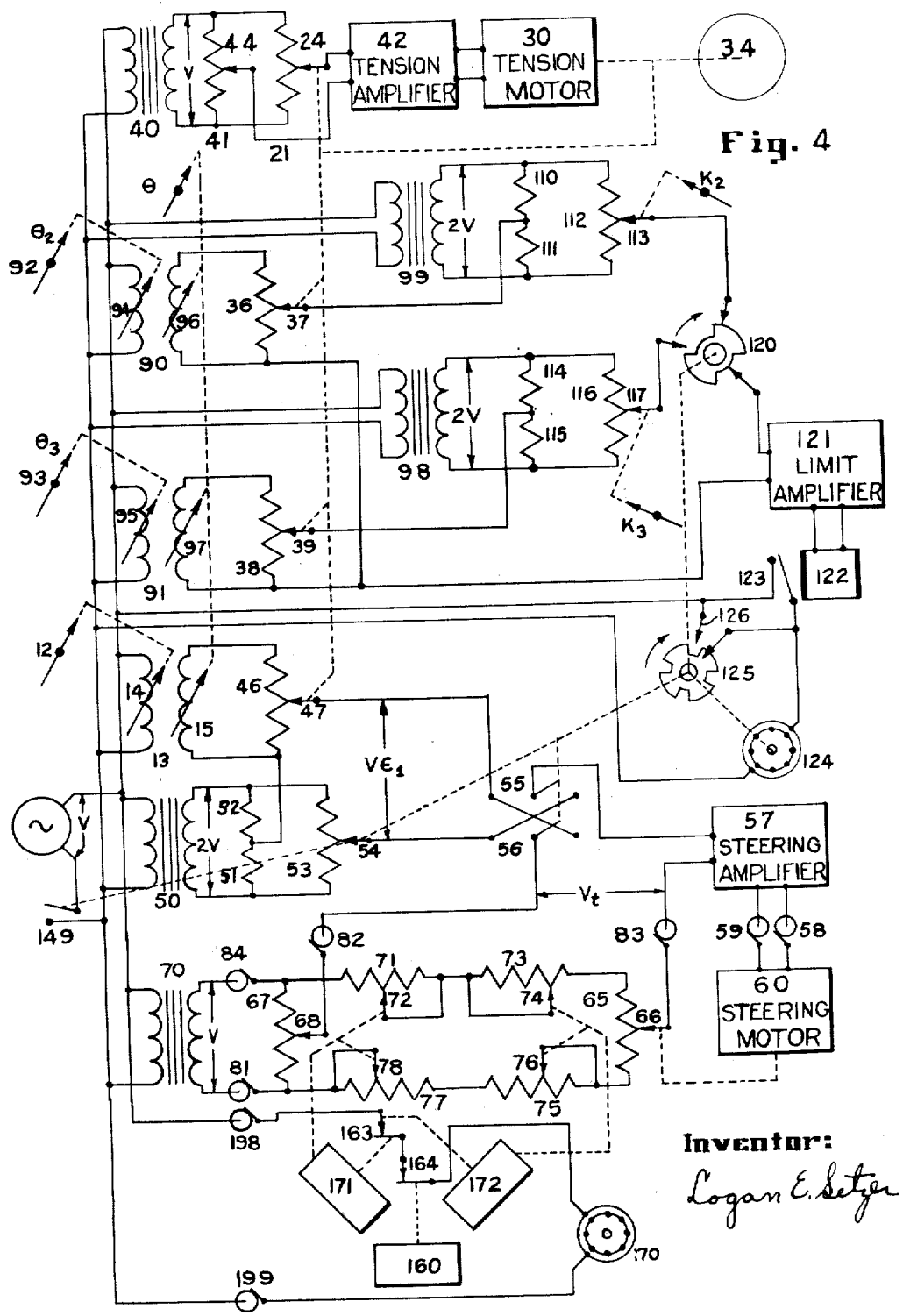
Fig. 4 is an electrical schematic and block diagram showing schematically how the components may be connected to control the automatic sweeping of an area such as that shown in Fig. 2.

As shown at the extreme left edge of Fig. 4, the electrical equipment employed may be powered with an alternating current V from any A. C. source, illustrated as an alternator, and may be controlled by any suitable means, such as the switch 149. Reference voltages for particular parts of the equipment may be supplied directly, or through suitable transformers as indicated at 40, 50, 70, 98, and 99.

*Cable tensioning means*

Referring again to Fig. 1, and to Figs. 4 and 5, the assembly consisting of parts 10, 11, and 16 through 24, inclusive, is a device for measuring the tension in cable 11. Its operation is explained as follows: Two pulleys 17 and 18 are mounted on arm 16. Arm 16 is attached to the upper end of tube 10. Cable 11 is fed over pulleys 17 and 18 and through tube 10. Another pulley 20 is mounted on lever 19. Lever 19 is attached to the shaft or rotating member 28 of a potentiometer or other electrical sensing device 21 so as to move wiper 24 of potentiometer 21 (see Fig. 4) if lever 19 moves. A spring 22 is attached to the pulley end of lever 19 and to arm 16 so as to exert a pressure through pulley 20 on cable 11 in the direction of arm 16. If the tension in cable 11 is increased pulley 20 will be pulled away from arm 16 and lever 19 will turn shaft 28 of potentiometer 21, moving wiper 24 along the winding of potentiometer 21 and producing an electrical signal proportional to the change of tension and of a given phase. If the tension in cable 11 is decreased then spring 22 will pull lever 19 toward arm 16, turning the shaft of potentiometer 21 so as to produce a signal of opposite phase from that produced by increasing the tension in cable 11. Counterweight 23 serves to balance the assembly about tube 10 upon which the assembly is mounted. Another function of arm 16 is to indicate the direction to guidance point 1. Tube 10 is mounted in bearings 27 and 29 so that it is free to rotate about its vertical axis. The tension in cable 11 pulling against the sides of the groove in pulley 18 causes tube 10 to turn about the axis of arm 16 to align with the direction to guidance point 1. Tension in cable 11 is maintained by tension servomotor 30 (Figs. 1 and 6) and cable drum 34. As best shown in Figs. 5 and 6, cable 11 passes through tube 10, under pulley 25, and around cable drum 34. Cable drum 34 is driven by servo or tension motor 30 by means of pulleys 31 and 33 and belt 32.

Fig. 4 at its top shows schematically how the servo or tension motor 30 is controlled by the potentiometer 21 of the cable tension measuring device (top of Fig. 5). A reference voltage V is supplied by transformer 40 to two potentiometers 21 and 41. Potentiometers 21 and 41 are connected so as to form a Wheatstone bridge, the ends of the resistance windings being connected together and connected to transformer 40 as shown in Fig. 4, and the output of the bridge taken from wipers 24 and 44 is zero if wipers 24 and 44 are displaced equal electrical distances along the windings of potentiometers 21 and 41. But since wiper 24 is operated by lever 19 in response to any change in tension in cable 11, the bridge will be unbalanced when there is a change in the tension in cable 11, and a voltage will appear at the input to tension amplifier 42. The specific design of amplifier 42 is not a part of this invention, since there are many types of amplifiers known to the art that will meet the requirements of this amplifier.

As an example of a known form of phase responsive amplifier capable of reversely driving a motor, reference may be made to Civil Aeronautics Administration Technical Development Report No. 152, "The CAA Type I Course Line Computer," by Chester B. Watts, Jr., and Logan E. Setzer, page 4, DME Servo.

Specifically, this amplifier must accept the signal appearing between wipers 24 and 44 and produce an output of sufficient power to drive tension motor 30 and cable drum 34 so as to maintain the desired tension in cable 11. Also, the output of amplifier 42 must be polarized so that when lever 19 moves toward arm 16 because tension in cable 11 is too small, motor 30 will drive cable drum 34 to draw in cable 11, thereby increasing the tension in cable 11 and pulling lever 19 away from arm 16 and *restoring* the bridge to a balanced condition. Likewise, if the tension in cable 11 increases, pulling lever 19 too far away from arm 16 and unbalancing the bridge in the other direction, the output of amplifier 42 must be polarized so that motor 30 drives cable drum 34 to pay out cable 11, thereby reducing the tension in cable 11, permitting lever 19 to move toward arm 16, and again balancing the bridge. Thus, any change in the tension in cable 11 will cause cable 11 to be drawn in or payed out to restore the selected tension. If the guidance point 1 (Fig. 2) moves toward control station 7, cable 11 will be drawn in, but if guidance point 1 moves away from control station 7, then cable 11 will be payed out. Tension in cable 11 is adjusted so that cable 11 will clear all obstacles in the field to be traversed. The tension in cable 11 is determined by three factors: (a) the stiffness of spring 22, (b) the point along lever 19 where spring 22 is attached to lever 19, and (c) the setting of wiper 44. Thus, the stiffer spring 22, the more tension required in cable 11 to move lever 19 away from arm 16. Also, the nearer spring 22 is attached to the pulley end of lever 19, the greater is the tension required in cable 11, since lever 19 has its fulcrum at the shaft of potentiometer 21 and is actuated by the force of cable 11 acting on the shaft of pulley 20. The setting of wiper 44 affects the tension in cable 11, since for a given setting of wiper 24 there is only one position of wiper 44 which will balance the tension bridge. If wiper 44 is adjusted so that lever 19 is near arm 16 for balance, then there must be a large sag and little tension in cable 11. But if wiper 44 is adjusted so that lever 19 is far from arm 16 for balance, then there must be a greater tension in cable 11 to hold lever 19 away from arm 16. Wires connect potentiometer 21 electrically to its associated circuits through electrical cables 85 and 86, and a set of slip rings 26 mounted on tube 10.

Cable circuits and length measurement

Mounted on the shaft of cable drum 34 (as best shown in Fig. 6) is a set of slip rings 35, consisting of rings 58, 59, 81, 82, 83, 84, 198, and 199 (located on the broken line, at the bottom of Fig. 4) necessary for connecting cable 11 to the amplifier and power circuits contained in the control station. Also attached to the shaft of cable drum 34 are distance sensing potentiometers 36, 38, and 46, arranged so that the displacement of potentiometer wipers 37, 39, and 47 (Figs. 4 and 6) from the reference ends of the respective potentiometers 36, 38, and 46 is proportional to the amount of cable 11 which is payed out.

Course resolving

The connections of the computing circuits and their operation are explained by reference to Fig. 4. A reference voltage V (an alternating current from transformer 40) is applied to the winding on stator 14 of resolver 13. This is the course resolver and provides turn signals for the steering servo. For the purposes of this specification, a resolver is any electro-mechanical device consisting of a stator and a rotor so equipped that when the resolver is supplied with a constant voltage it will provide an electrical output proportional to the sine of the angle between a reference position of the rotor and the stator. In general practice, there are many kinds of resolvers. Potentiometers may have their winding tapered so that the resistance between one end of the potentiometer and the wiper varies as a sine function of the displacement of the wiper. A second type of resistance resolver has a resistance winding on a square card on the stator and two wipers are arranged on the rotor so as to rotate about the center of the stator resistance winding. With this arrangement, if the stator winding is excited with a constant voltage, the voltage between the wipers of the rotor will be a sine function of the angle between the physical position of the wipers and a reference direction parallel to the direction the wire is wound on the stator. The resolvers used in the present embodiment are electromagnetic devices having winding on the rotor and stator. These windings are inductively coupled and are so disposed that when either the rotor or the stator is excited by an alternating current voltage of constant amplitude, a voltage is induced in the other winding of an amplitude proportional to the sine of the angle between the rotor and the stator. Devices of this kind are manufactured by several companies in the United States. The characteristics of this device are not claimed as a part of the present invention. Four characteristics are important in the present embodiment: (a) The output should depart as little as is practical from a true sine function of the position of the rotor; (b) the capacitive coupling between the rotor and stator windings should be as small as practical so that the signal will reduce to zero when the rotor displacement is 0° or 180°. Capacitive coupling presents a voltage 90° out of phase with the desired signal and saturates the amplifier so that the balance or null obtainable by the servo is broad and the sensitivity of the servo at the balance point is reduced; that is, a larger error signal is required to produce a correction; (c) the impedance of the output winding should be as low as practical so as to reduce the loading effects of the circuitry which is supplied by the resolver. The loading causes the output to depart from a true sine function; and (d) the resolver should be physically small so as not to require a cumbersome mounting and gearing arrangement.

With the index 12 of resolver 13 set on the polar axis, the angle $\theta$ appears between stator 14 and rotor 15 of resolver 13, as the rotor takes the cable angle. As explained hereinbefore, resolver 13 is arranged so that a voltage will be induced in rotor winding 15 which is proportional to the sine of angle $\theta$ between rotor 15 and stator 14. That voltage may be represented as the quantity $V \sin \theta$. It is applied to the winding of potentiometer 46. Since potentiometer wiper 47 is displaced from the reference end of potentiometer 46 by a distance proportional to the amount of cable 11 which is payed out, which measures the distance R in Fig. 2, the voltage between the reference end of potentiometer 46 and wiper 47 may be represented by the quantity $VR \sin \theta$.

A voltage proportional to distance $K_1$ of Fig. 2 is produced by components 50, 51, 52, 53, and 54 shown in Fig. 4. Transformer 50 is connected to the reference voltage source V and has a ratio of transformation such that a voltage equal to 2V appears at its output terminals. Resistors 51 and 52 have equal values of resistance and are connected in series across the output of transformer 50. Potentiometer 53 is also connected across the output of transformer 50. The voltage output of this combination appears between the junction of the two series connected resistors 51 and 52, and wiper 54 of potentiometer 53. The value of this output may be represented by the quantity $VK_1$ in Equation 1. It can be varied from V to $-V$ as wiper 54 is moved from one end to the other end of the winding of potentiometer 53, and will be zero when wiper 54 is at the center of the winding. Wiper 54 is manually set to an initial value at the beginning of operations, but is automatically readjusted each time vehicle 100 reaches a limit line, as is explained hereinafter.

The voltage $VR \sin \theta$ is added algebraically to the voltage $VK_1$ obtained as shown above, and the resultant is the voltage $VE_1$ which appears between the wiper 54 of potentiometer 53 and wiper 47 of potentiometer 46, and which is proportional to the displacement of guidance point 1 from course 2 (Fig. 1). For vehicle 100 to make good course 2 the voltage $VE_1$ must be kept equal to zero. This is accomplished by feeding voltage $VE_1$ to amplifier 57 and steering servo motor 60 in a manner hereinafter described, so that vehicle 100 turns at a rate proportional to the magnitude of voltage $VE_1$ and in a direction depending upon the phase of $VE_1$ and the position of the direction selector switches 55 and 56. As is the case with tension amplifier 42, the specific design of steering amplifier 57 is not a part of this invention, except that it must be capable of operating steering motor 60 as herein described. For vehicle 100 to travel along course 2 of Fig. 1 in the direction indicated by the arrow, the signals applied to amplifier 57 which controls steering servo motor 60 must be phased so that when voltage $VR \sin \theta$ is less than voltage $VK_1$, vehicle 100 will turn to the left, and when voltage $VR \sin \theta$ is greater than voltage $VK_1$, vehicle 100 will turn to the right. At the beginning of operations switches 55 and 56 are manually set to cause vehicle 100 to go in the desired direction. Since vehicle 100 travels in opposite directions along alternate courses, switches 55 and 56 must be operated each time vehicle 100 reaches a travel limit.

Rate of turn control

Control that will maintain a rate of turn proportional to displacement from course is accomplished by a suitable rate of turn controlling network that in the illustrative embodiment comprises an electrical system the constants and variables of which are related to produce such rate of turn as follows: A repeat-back potentiometer 65 is attached to steering motor 60 (Fig. 4). Potentiometers 71 and 73 are connected in series with one side of potentiometer 65, and potentiometers 75 and 77 are connected in series with the other side of potentiometer 65. This assembly is energized by transformer 70 from the voltage source V, through slip rings 81 and 84, and is connected in parallel with potentiometer 67. Potentiometer 67 is for centering guidance point 1 accurately on the desired course. When guidance point 1 is displaced from course 2 steering motor 60 will immediately cause vehicle 100 to assume a rate of turn such that voltage $V_t$ between wipers 66 and 68 of potentiometers 65 and 67, respectively, is equal to the voltage $VE_1$. Voltage $V_t$ is fed through slip rings 82 and 83 so as to be added algebraically to voltage $VE_1$, and the algebraic sum is fed to amplifier 57. As guidance point 1 approaches course 2 voltage $VE_1$ will decrease. As voltage $VE_1$ decreases it will become less than voltage $V_t$, resulting in a voltage at the input of amplifier 57 calling for a reduced rate of turn. This process continues until vehicle 100 is not turning when guidance point 1 is on the desired course. The process just described produces a rate of turn of vehicle 100 proportional to the displacement of guidance point 1 from the desired course 2.

Hunting elimination

If guidance point 1 were at vehicle 100, vehicle 100 would continue to turn toward course 2 until course 2 was reached. Vehicle 100 would be headed at a large angle to course 2 when it arrived at course 2, and would "hunt" or oscillate about course 2 instead of traveling along course 2 in a direct and orderly manner. The following is a mechanical method of anticipating the arrival of vehicle 100 at course 2 and causing vehicle 100 to turn along and make good course 2 without undue oscillation. Instead of guidance point 1 being located at vehicle 100, it is at the front end of boom 80. When vehicle 100 turns toward course 2, guidance point 1 at the front end of boom 80 will move toward course 2 faster than vehicle 100. As vehicle 100 travels toward course 2, the front end of boom 80, which is guidance point 1, will cross course 2 before vehicle 100 reaches course 2 and will cause vehicle 100 to turn along course 2. The amount of anticipation is determined by the length of boom 80 and should be adjusted to produce the most desirable amount of damping.

Changing course direction

The foregoing discussion describes the mechanism by which, and manner in which, vehicle 100 is guided along course 2. Now let us examine the manner in which vehicle 100 determines its arrival at the limit lines and selects a new course. Reference is had to Figs. 1 and 5. Frame 94 of resolver 90 is mounted on limit line direction indicator 92, and rotor 96 of resolver 90 is geared to tube 10. Likewise frame 95 of resolver 91 (Fig. 1 only) is mounted on limit line direction indicator 93, and rotor 97 of resolver 91 is geared to tube 10. Both limit line direction indicators 92 and 93 are mounted on reference direction indicator 12. Limit line direction indicator 92 determines the direction of limit line 3 (Fig. 2), and is manually adjusted to form the angle $\theta_2$ with respect to reference direction indicator 12. Likewise limit line direction indicator 93 determines the bearing of limit line 5 (Fig. 2), and is manually adjusted to form the angle $\theta_3$ with respect to reference direction indicator 12.

Referring now to Fig. 4, voltage V is applied to the windings on stators 94 and 95 of resolvers 90 and 91. As in the case of resolver 13, resolvers 90 and 91 are electromagnetic machines so arranged that when a voltage V is applied to the stator windings, a voltage will be induced in the rotor winding which is proportional to the sine of the angle between the rotor and the stator windings. In the case of resolver 90, stator 94 is rotated through an angle $\theta_2$ from the reference direction by limit line directional indicator 92, and rotor 96, which is geared to tube 10, is turned through angle $\theta$. Thus the angle between stator 94 and rotor 96 is the algebraic difference between angles $\theta$ and $\theta_2$ and the voltage induced in the rotor winding may be represented by the quantity $V \sin (\theta - \theta_2)$. Likewise, in the case of resolver 91, stator 95 is rotated through an angle $\theta_3$ from the reference direction by limit line direction indicator 93, and rotor 97, which is also geared to tube 10, is turned through angle $\theta$. Thus the angle between stator 94 and rotor 96 is the algebraic difference between angles $\theta$ and $\theta_2$ and the voltage induced in the rotor winding may be represented by the quantity $V \sin (\theta - \theta_2)$. Likewise, in the case of resolver 91, stator 95 is rotated through an angle $\theta_3$ from the reference direction by limit line direction indicator 93, and rotor 97, which is also geared to tube 10, is turned through angle $\theta$. Thus the angle between stator 95 and rotor 97 is the algebraic difference between angles $\theta$ and $\theta_3$, and the voltage induced in the rotor winding may be represented by the quantity $V \sin (\theta - \theta_3)$.

The voltage $V \sin (\theta - \theta_2)$ which is induced into the winding on rotor 96 is applied to potentiometer 36. Since wiper 37 is displaced from the reference end of potentiometer 36 by a distance proportional to the amount of cable 11 which is payed out, and since the amount of cable 11 which is payed out is a measure of the distance R between tube 10 and guidance point 1, the voltage appearing between wiper 37 and the reference end of potentiometer 36 may be represented by the quantity $VR \sin (\theta - \theta_2)$. Likewise, the voltage $V \sin (\theta - \theta_3)$ which is induced into the winding on rotor 97 is applied to potentiometer 38 and the voltage appearing between wiper 39 and the reference end of potentiometer 38 may be represented by the quantity $VR \sin (\theta - \theta_3)$.

Voltages proportional to distance $K_2$ and $K_3$ of Fig. 2 are produced as follows: Referring to Fig. 4, the voltage V is applied to identical transformers 98 and 99. The ratio of transformation is such that a voltage equal to 2V appears at the output of the transformers. Two equal resistors 110 and 111 are connected in series across the output of transformer 99. Potentiometer 112 is also connected across the output of transformer 99. The output from this combination apepars between the junction of resistors 110 and 111 and wiper 113 of potentiometer 112. The output may be varied from a value equal to $+V$ to a value equal to $-V$, and is manually adjusted to be proportional to $K_2$. This voltage is connected in series with the voltage $VR \sin (\theta - \theta_2)$ by connecting wiper 37 to the junction between resistors 110 and 111 so that a voltage $VK_2-VR \sin (\theta-\theta_2)$ appears between the reference end of potentiometer 36 and wiper 113. This voltage is proportional to $E_2$ of Equation 2 and of Fig. 2, and may be represented by $VE_2$. Its use to determine the arrival of guidance point 1 at limit line 3 is described hereinafter.

Two equal resistors 114 and 115 are connected in series across the output of transformer 98. Potentiometer 116 is also connected across the output of transformer 98. The output from this combination appears between the junction of resistors 114 and 115 and wiper 117 of potentiometer 116. The output may be varied from a value equal to $+V$ to a value equal to $-V$, and is manually adjusted to be proportional to $K_3$. This voltage is connected in series with the voltage $VR \sin (\theta-\theta_3)$ by connecting wiper 39 to the junction between resistors 114 and 115 so that a voltage $VK_3-VR \sin (\theta-\theta_3)$ appears between the reference end of potentiometer 38 and wiper 117. This voltage is proportional to $E_3$ of Equation 3 and Fig. 2, and may be represented by $VE_3$. Its use to determine the arrival of guidance point 1 at limit line 3 is described hereinafter. Referring now to Fig. 2, the voltage $VE_2$ is proportional to the distance $E_2$ between guidance point 1 and limit line 3, and will be zero when guidance point 1 is at limit line 3. Also, the voltage $VE_3$ is proportional to the distance $E_3$ between guidance point 1 and limit line 5, and will be zero when guidance point 1 is at limit line 5.

Figure 3:
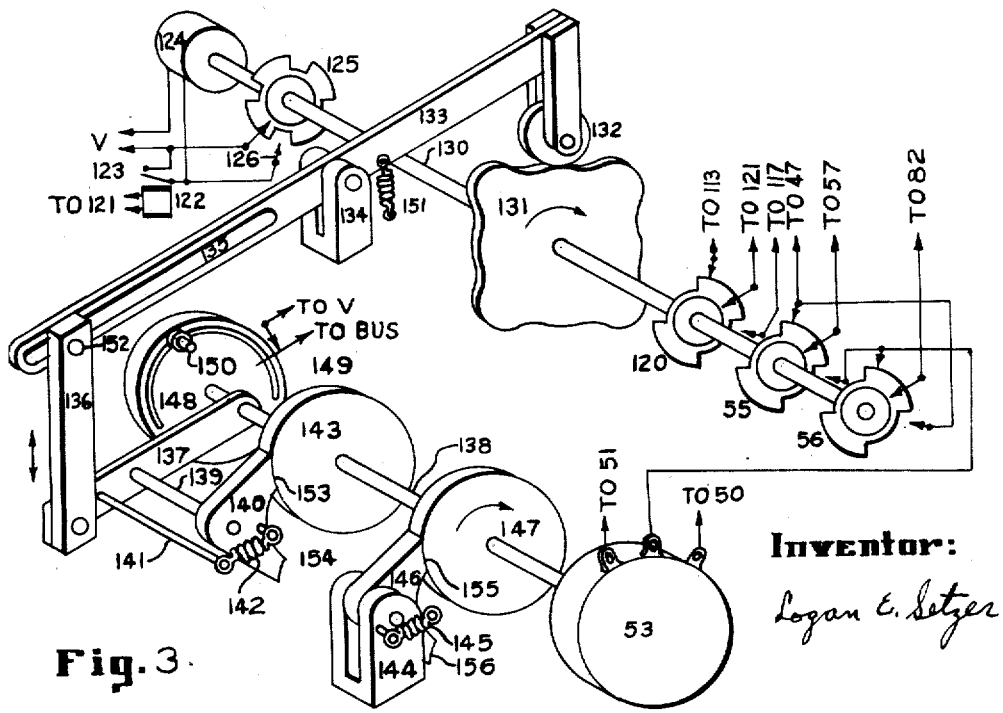
Fig. 3 is a more or less diagrammatic expanded perspective of illustrative course and limit selector mechanisms and electrical connections thereto.

Referring now to Fig. 4, wipers 113 and 117 of potentiometers 112 and 116 are connected to the terminals of single pole double throw switch 120 so that the voltages $VE_2$ and $VE_3$ may be selected alternately. The blade of switch 120 and the reference end of the windings of potentiometers 36 and 38 are connected to the input of limit amplifier 121. The output of amplifier 121 operates a relay 122 so that relay contacts 123 are open any time the voltage applied to the input of amplifier 121 is greater than approximately 5 percent of the reference voltage V. When relay contacts 123 close, switching motor 124 operates in the following sequence: Reference is now had to Fig. 3. Switch 125 mounted on the shaft of switching motor 124 is closed. This switch is in parallel with contacts 123 of relay 122 and will cause switching motor 124 to run until contact 126 is in a notch in switch 125. Then, if contact 123 is open, motor 124 will stop running. Simultaneously with the closing of switch 125, switching motor 124 causes switch 120 to operate. Referring now to Fig. 2, if the initial direction of travel of guidance point 1 is along course 2 in the direction toward limit line 3 then the initial setting of switch 120 (Fig. 4) will be such that the wiper 113 of potentiometer 112 and the reference end of the winding of potentiometer 36 are connected to the input terminals of amplifier 121. With this connection, the voltage at the input to amplifier 121 is $VE_2$. As guidance point 1 moves toward limit line 3, the voltage $VE_2$ will decrease in value. When guidance point 1 approaches limit line 3 the voltage $VE_2$ will become sufficiently small to permit relay 122 to release and close contacts 123, operating switching motor 124, which in turn operates switch 120, so as to switch the input to amplifier 121 from wiper 113 of potentiometer 112 to the wiper 117 of potentiometer 116. The voltage applied to the input of amplifier 121 is then $VE_3$ and is quite large, since guidance point 1 is at a considerable distance from limit line 5. Amplifier 121 will energize relay 122, opening contacts 123. This occurs before switching motor 124 moves switch 125 to open contact 126, so that switching motor 124 will stop when contact 126 opens, and remains stopped until relay contacts 123 are closed again. Contacts 123 will close again when guidance point 1 reaches limit line 5. Simultaneously with the closing of switch 125, and the operation of switch 120, switching motor 124 operates direction selector switches 55 and 56 causing a reversal in the direction of control for a given departure from the course, as described above. Finally, simultaneously with the closing of switch 125, operation of switches 120, 55, and 56, the switching motor readjusts the position of wiper 54 of potentiometer 53.

*Changing course location*

As explained above, the initial setting or wiper 54 of potentiometer 53 was such that voltage $VK_1$ appeared between wiper 54 of potentiometer 53 and the junction of the two series resistors 51 and 52. This setting of wiper 54 is required for guidance point 1 to move along line 2. The voltage $VK_1$ is proportional to the perpendicular distance $K_1$ (Fig. 1) from line 2 to control station 7. For guidance point 1 to move along line 4, voltage $VK_1$ must be changed to a new value of voltage $VK_4$ such that voltage $VK_4$ is proportional to the perpendicular distance $K_4$ from line 4 to control station 7. This may be accomplished by a mechanism consisting of links 130 through 156 (Fig. 3). Cam 131 is mounted on shaft 130 of motor 124. Cam 131 has four protrusions and is oriented on shaft 130 so that when switch blade 126 is not making contact, cam follower 132 will be resting on the base circle of cam 131 between two of the protrusions on cam 131. Follower 132 is on the end of lever 133 and is held against cam 131 by spring 151. Lever 133 is mounted to frame 206 of control station 101 on pivot 134. Lever 133 has slot 135 cut along it on the opposite side of pivot 134 from follower 132. Connecting link 136 is fastened to lever 133 by pin 152 which is adjustable along slot 135. The opposite end of connecting link 136 is pivoted to lever arm 137 which bears on shaft 138 of potentiometer 53. Wiper 54 of potentiometer 53 is attached to shaft 138. Ratchet 140 is mounted on lever arm 137 by shaft 139 and is loaded by spring 142 and mounting rod 141 so that friction surface 153 or friction surface 154 is held against drum 143. Ratchet 146 is mounted on frame 206 of control station 101 by bracket 144 and is loaded by spring 145 so that either friction surface 155 or 156 is held in contact with drum 147.

Operation of the mechanism is as follows: As cam 131 rotates, follower 132 rises upon a protrusion on cam 131 and link 136 is forced down carrying shaft 139 and ratchet 140 with it. Friction surface 153 is bearing against drum 143 and tends to rotate shaft 138 in a counterclockwise direction. However, ratchet 146 is loaded by spring 145 so that friction surface 155 is in contact with drum 147. In this position ratchet 146 exerts force through friction surface 155 which offers considerable resistance to counterclockwise rotation of drum 147 and shaft 138, while ratchet 140 will move in a counterclockwise direction around drum 143 with a relatively small amount of friction. Therefore, shaft 138 remains stationary as follower 132 travels to the top of the protrusion on cam 131. As cam 131 continues rotating follower 132 will travel down on the after side of the protrusion on cam 131, carrying link 136, lever 137, and ratchet 140 in an upward direction. When traveling in this direction, ratchet 140 exerts a considerable force through friction surface 153 on drum 143 tending to turn shaft 138 in a clockwise direction. With friction surface 155 of ratchet 146 being held against drum 147 there is relatively little resistance to clockwise rotation of shaft 138, so that as follower 132 moves down the after side of a protrusion on cam 131, shaft 138 will rotate in a clockwise direction. The amount of rotation of shaft 138 may be adjusted by moving pin 152 along slot 135 in lever 133. When pin 152 is near pivot 134 there will be a relatively small movement of link 136 when follower 132 goes over a protrusion on cam 131. But when pin 152 is far away from pivot 134 link 136 will move a relatively large distance when follower 132 goes over a protrusion on cam 131. To cause shaft 138 to rotate in a counterclockwise direction, ratchet 140 is adjusted so that friction surface 154 is held against drum 143 and ratchet 146 is adjusted so that friction surface 156 is held against drum 147. With ratchets 140 and 146 in these positions, ratchet 140 will exert a considerable force when tending to cause shaft 138 to rotate in a counterclockwise direction, and ratchet 146 will exert a considerable force to resist clockwise rotation, and shaft 138 will be turned in a counterclockwise direction as follower 132 moves upon a protrusion on cam 131, but shaft 138 remains stationary as follower 132 moves down from a protrusion on cam 131. Thus each operation of switching motor 124 moves shaft 138 and, thereby, wiper 54 of potentiometer 53 through an amount which corresponds to the amount one course is moved from another as guidance point 1 moves back and forth over the field.

Course termination

After a number of courses are completed, it is desirable to have a limit to the field. This may be done as follows: Referring to Fig. 3, drum 148 attached to shaft 138 has pin 150 mounted on it. As shaft 138 rotates pin 150 moves toward switch 149 so that after the last course has been completed and switching motor 124 again operates, switch 149 will be opened and the power supply to all units of the machine and control station will be disconnected, ending the operation. The position of pin 150 may be adjusted to limit the field to less than that corresponding to the available cable length by suitable means, as by locking it at different positions in the adjusting slot shown.

Other features

The foregoing description explains the basic principle of the method of control for which invention is claimed. However, some additional performance characteristics are required for successful and convenient operation of this method. These include a method and means for the prevention of collision with obstacles in the field. Referring to Figs. 1, 7, and 8, the collision prevention equipment is mounted on beam 162 of vehicle 100. Bumper 160 is mounted on slider 161 so that in event bumper 160 collides with an obstacle, slider 161 will open switch 164 (see also bottom of Fig. 4) disconnecting the power to drive motor 170 of vehicle 100 and stopping the vehicle. This device prevents damage from head-on collision. Also, fender 172 is mounted by hinged links 165 and 167 to the left side of beam 162. Spring 158 is attached to link 165 and beam 162 so as to hold fender 172 out away from beam 162. Link 167 is attached to the shaft of potentiometers 73 and 75 so that when fender 172 comes in contact with an obstacle, link 167 will turn, carrying fender 172 toward beam 162 and rotating the shaft of potentiometers 73 and 75. Likewise, fender 171 is mounted on the right hand side of beam 162 by hinged links 166 and 168. Spring 159 is attached to link 166 and beam 162 so as to hold fender 171 out away from beam 162. The shaft of potentiometers 71 and 77 is attached to link 168 so that when fender 171 comes in contact with an obstacle, fender 171 is pushed toward beam 162 and link 168 turns the shaft of potentiometers 71 and 77. Referring now to Fig. 4, potentiometers 73 and 75 make up a dual potentiometer assembly. Also, potentiometers 71 and 77 make up a dual potentiometer assembly. These potentiometers are connected in series with the steering repeat-back potentiometer 65 so that when the shaft of potentiometers 73 and 75 is rotated, potentiometer 73 adds resistance in series with one side of potentiometer 65 and potentiometer 75 removes resistance from the other side of potentiometer 65. This changes the value of $V_t$ discussed above so as to cause amplifier 57 to operate steering motor 60 so as to turn vehicle 100 to the right, away from the obstacle. If fender 171 comes in contact with an obstacle, then potentiometer 71 is operated so as to remove resistance from the first side of potentiometer 65 and potentiometer 77 is operated so as to add resistance to the other side of potentiometer 65. This causes a change in voltage $V_t$ such that amplifier 57 drives steering motor 60 to cause vehicle 100 to make a left hand turn away from the obstacle. In other words, the impingement of a side-swipe fender means 171 or 172 against an obstacle alters the constants of the rate of turn controlling network to cause it to drive the steering motor in a direction to steer the vehicle out of the given course toward the side thereof away from the obstacle during such impingement, relief of such impingement restoring the constants of the network for then enabling the steering motor and remote control means to return the vehicle to the given course. Should fenders 171 and 172 strike obstacles simultaneously then links 165 and 166 will operate switch 163 so that the power will be disconnected from driving motor 170 of vehicle 100 thus stopping vehicle 100. These assemblies prevent damage due to side swiping collisions, permitting the vehicle to continue in operation in case only one side comes in contact with an obstruction, but stopping the vehicle in case there are two obstructions the machine cannot pass between.

To facilitate operation and maintenance, amplifiers 42, 57, and 121, and control panel 157 are mounted on middle deck 204 of control station 101 in the embodiment presented. Limit relay 122, motor 124 and associated mechanism are mounted on control panel 157, as are potentiometers 112, 116, and 41.

While there have been described herein what are at present considered preferred embodiments of the several features of the invention, it will be obvious to those skilled in the art that minor modifications and changes may be made therein without departing from the essence of the invention. For example, it will be appreciated that for the measurements of angularity and distance, the cable 11 need not be a signal conveyor, but may be a simple tether, signals being conveyed by other means, and that various ones of the measurements may be made by other methods or means serving equivalent functions in the novel combinations or sub-combinations of this invention. It is therefore to be understood that the exemplary embodiments are illustrative and not restrictive of the invention, the scope of which is defined in the appended claims, and that all modifications that come within the meaning and range of equivalency of the claims are intended to be included therein.

The invention described herein, if patented, may be manufactured and used by or for the Government of the United States for governmental purposes without the payment of any royalty thereon, in accordance with the provisions of Title 35, United States Code, section 266.

I claim:

1. Apparatus for guiding along a predetermined straight guidance line, from a fixed reference control station, a self-propelled vehicle having signal controllable steering means, which apparatus comprises: means for continuously measuring the distance to the vehicle from the station and the azimuthal direction to the vehicle from the station, and means for transmitting to the vehicle controlling signals for steering the vehicle to continuously adjust the measured distance relative to the measured azimuthal angle to conform to the polar coordinates of said guidance line relative to the control station.

2. Apparatus for guiding along a predetermined straight guidance line a self-propelled vehicle having signal controllable steering means and connected to a fixed reference control station by a tether capable of being paid out and drawn in, which apparatus comprises: means for continuously maintaining the tether at substantially a predetermined tension, means for continuously measuring the length of tether extending to the vehicle and the azimuthal angle of departure of the tether theretoward from the control station, and means for transmitting to the vehicle controlling signals for steering the vehicle to conform the measured tether length and angle to the polar coordinates of said guidance line relative to the control station.

3. Apparatus for guiding along a predetermined straight guidance line a self-propelled vehicle having signal controllable steering means and connected to a fixed reference control station by a tether capable of being paid out and drawn in, which apparatus comprises: means for continuously maintaining the tether at substantially a predetermined tension, means for continuously measuring the length of tether extending to the vehicle and the azimuthal angle to the vehicle from the control station, and means for transmitting to the vehicle controlling signals for steering the vehicle to conform the measured tether length and angle to the polar coordinates of said guidance line relative to the control station.

4. Apparatus for guiding along a predetermined straight guidance line a self-propelled vehicle having signal controllable steering means and connected to a fixed reference control station by a tether capable of being paid out and drawn in, which apparatus comprises: means for continuously maintaining the tether at substantially a predetermined tension, means for continuously measuring the distance from the control station to the vehicle and the azimuthal angle of departure of the tether theretoward from the control station, and means for transmitting to the vehicle controlling signals for steering the vehicle to conform the measured tether length and angle to the polar coordinates of said guidance line relative to the control station.

5. Apparatus for changing the course of a self-propelled vehicle, by remote control from a fixed reference control station, when the vehicle arrives in proximity to a predetermined limit line, comprising, in combination, means for measuring the azimuthal direction and distance from the control station of the limit line, means for measuring the azimuthal direction and distance to the moving vehicle from the control station, means for deriving from said measurements a signal reflecting the distance of the vehicle from the limit line, and means responsive to said signal for altering the course of the vehicle.

6. A combination according to claim 5, the vehicle being connected to the control station by a tether capable of being paid out and drawn in, said combination further comprising means for steering the vehicle and means for maintaining the tether at substantially a predetermined tension as the tether is paid out and drawn in, said means for measuring the azimuthal direction and distance to the vehicle comprising means for measuring the azimuthal angle of departure and paid out length of the tether.

7. A remote controllable self-propelled vehicle comprising a frame, a motor carried by said frame, supporting wheels mounted on said frame including a driving wheel steerably pivoted to said frame, means for driving said driving wheel from said motor, a steering motor carried by said frame and connected to steer said driving wheel, remote control means including a variable voltage source and a rate of turn controlling network in part energized thereby for actuating said steering motor to produce a rate of turn of the vehicle toward a given course proportional to the displacement of the vehicle from said given course, to guide the vehicle on said given course, side swipe fender means at one side of said vehicle, and means responsive to impingement of said side-swipe fender means against an obstacle for altering the constants of said network for driving the steering motor in a direction to steer the vehicle out of said given course toward the side thereof away from the obstacle during such impingement, relief of said impingement restoring the constants of said network for then enabling said steering motor and said remote control means to return said vehicle to said given course.

8. In an automatic guidance system for a self-propelled vehicle connected to a reference control station by a tether capable of being paid out and drawn in, the sub-combination of means for varying the outstanding length of the tether by paying out and drawing in the same, means for continuously maintaining the tether at substantially a predetermined tension, means for continuously varying an electrical current in accordance with the outstanding length of the tether, and guidance means for the vehicle including control means continuously responsive to the variation of said electrical current.

9. In an automatic guidance system for a self-propelled vehicle connected to a fixed reference control station by a tether capable of being paid out and drawn in, the sub-combination of means for continuously maintaining the tether at substantially a predetermined tension, means for continuously varying an electrical current in accordance with the azimuthal angle of the tether with reference to a predetermined azimuthal direction, the automatic guidance system for the self-propelled vehicle comprising guidance means for the vehicle automatically controlled at least in part in accordance with the variation of said electrical current.

10. A sub-combination according to claim 9 further comprising means for varying the outstanding length of the tether and means for varying an electrical current in accordance with the outstanding length of the tether, the automatic guidance system for the self-propelled vehicle comprising guidance means for the vehicle automatically controlled at least in part in accordance with the variation of said electrical current.

11. A sub-combination according to claim 9 in which the current varying means varies the current in accordance with a trigonometric function of the tether angle.

12. A sub-combination according to claim 11 in which the current varying means varies the current in accordance with the sine of the tether angle.

13. A sub-combination according to claim 12 further comprising means for varying the outstanding length of the tether and means for varying an electrical current in accordance with the outstanding length of the tether.

14. A sub-combination according to claim 13 in which the two current varying means operate on the same electrical current so that it is varied in accordance with the product of the outstanding length of cable and the sine of the tether angle.

15. A sub-combination according to claim 12 further comprising means for varying an electrical current in accordance with the perpendicular distance from the control station to a rectilinear course to be followed by the vehicle.

16. A sub-combination according to claim 14 further comprising means for varying an electrical current in accordance with the perpendicular distance from the control station to a rectilinear course to be followed by the vehicle, and means for comparing the product varied current with the perpendicular distance current, said guidance means comprising means responsive to the difference in such currents for steering the vehicle to bring such compared currents into equality.

17. A sub-combination according to claim 16 further comprising means for varying a reference current in response to steering of the vehicle, and means for applying the so varied reference current to counteract the difference current for modifying the rate of steering of the vehicle.

18. A sub-combination according to claim 16 further comprising means carried by the vehicle for detecting the presence of an obstacle partly in the path of the vehicle and for varying a current in response to such detection, and means for applying the so-varied current for modifying the steering of the vehicle to cause it to detour about the obstacle.

19. A sub-combination according to claim 16 further comprising means carried by the vehicle for detecting the presence of an obstacle directly in the path of the vehicle and for stopping the vehicle in response to such detection.

20. A sub-combination according to claim 9 in which the current varying means varies the current in accordance with the azimuthal angle of the tether with respect to the azimuthal direction of the course to be followed by the vehicle.

21. A sub-combination according to claim 9 in which the current varying means varies the current in accordance with the azimuthal angle of the tether with respect to the azimuthal angle of a boundary limiting the course to be followed by the vehicle.

22. A sub-combination according to claim 21 in which the current varying means varies the current in accordance with the sine of the angle $\theta - \theta_2$, in which $\theta$ is the tether angle with respect to the direction of course of the vehicle and $\theta_2$ is the angle with respect to such course direction of a boundary limiting the said course.

23. A sub-combination according to claim 22 further comprising means for varying the electrical current in accordance with the outstanding length of the tether so that the current represents a distance from the vehicle in the direction perpendicular to said boundary when the vehicle is positioned inside said course limiting boundary.

24. A sub-combination according to claim 23 further comprising means for varying an electrical current in accordance with the perpendicular distance of the boundary line from the fixed reference control station, and means for deriving from the two distance varied currents a boundary approach signal.

25. A sub-combination according to claim 24 further comprising means controlled by said boundary approach signal for altering the course of the vehicle.

26. A sub-combination according to claim 25 further comprising means for varying an electrical current in accordance with the perpendicular distance from the control station to a rectilinear course to be followed by the vehicle, and means actuated in response to said boundary approach signal for modifying the setting of said last named means to establish a new course for the vehicle at a different perpendicular distance from the control station.

27. A sub-combination according to claim 26 further comprising means for stopping the vehicle actuated by said course distance varying means when the latter has been reset to a predetermined limit.

28. A remote controllable self propelled vehicle comprising a frame, a motor carried by the frame, supporting and driving wheel means mounted on said frame, means for driving said driving wheel means from said motor, a steering motor carried by said frame and connected to steer said steering wheel means, remote control means for actuating said steering motor to guide the vehicle on a given course, side swipe fender means at each side of the vehicle, means responsive to impingement of each side swipe fender means, independently, against an obstacle, for driving the steering motor in a direction to steer the vehicle toward the side thereof away from the obstacle during such impingement, said steering motor and said remote control means returning said vehicle to said given course when such independent impingement is relieved, and means responsive to simultaneous impingement of said side swipe fender means on both sides of the vehicle with obstacles for stopping said driving motor.

References Cited in the file of this patent
UNITED STATES PATENTS

| | | |
|---|---|---|
| 867,765 | Strickler | Oct. 8, 1907 |
| 1,251,639 | Chadwick | Jan. 1, 1918 |
| 1,936,054 | Harzbecker | Nov. 21, 1933 |
| 2,165,800 | Koch | July 11, 1939 |
| 2,259,193 | Andrew | Oct. 14, 1941 |
| 2,444,678 | Sanders | July 6, 1948 |
| 2,509,914 | Goodwine | May 9, 1950 |
| 2,512,693 | Sparks et al. | June 27, 1950 |
| 2,513,868 | Hill | July 4, 1950 |
| 2,582,588 | Fennessy et al. | Jan. 15, 1952 |
| 2,636,166 | Herbst | Apr. 21, 1953 |
| 2,661,070 | Ferrill | Dec. 1, 1953 |
| 2,674,332 | Ovshinsky | Apr. 6, 1954 |

U. S. DEPARTMENT OF COMMERCE
PATENT OFFICE

CERTIFICATE OF CORRECTION

Patent No. 2,789,649                                        April 23, 1957

Logan E. Setzer

It is hereby certified that error appears in the printed specification of the above numbered patent requiring correction and that the said Letters Patent should read as corrected below.

Column 6, line 70, and column 7, line 7, for "Fig. 1", each occurrence, read -- Fig. 2 --; column 8, line 62, for "distance" read -- distances --; line 70 for "apepars" read -- appears --; column 10, line 15, for "Fig. 1" read -- Fig. 2 --.

Signed and sealed this 25th day of February 1958.

(SEAL)
Attest:

KARL H. AXLINE                                                        ROBERT C. WATSON
Attesting Officer                                          Commissioner of Patents